United States Patent
Lee et al.

(10) Patent No.: US 10,215,332 B2
(45) Date of Patent: Feb. 26, 2019

(54) APPARATUS FOR SUPPORTING DISPLAY PANEL

(71) Applicant: Samsung Display Co., Ltd., Yongin-si, Gyeonggi-do (KR)

(72) Inventors: Sang Wol Lee, Yongin-si (KR); Man Sik Myeong, Seoul (KR); Sang Il Park, Seoul (KR); Sang Wook Lee, Seoul (KR); Sang Chul Lee, Namyangju-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 149 days.

(21) Appl. No.: 14/869,878

(22) Filed: Sep. 29, 2015

(65) Prior Publication Data

US 2016/0135324 A1    May 12, 2016

(30) Foreign Application Priority Data

Nov. 11, 2014 (KR) .................. 10-2014-0156101

(51) Int. Cl.
  *F16M 13/00* (2006.01)
  *G06F 1/16* (2006.01)
  *F16M 11/38* (2006.01)

(52) U.S. Cl.
  CPC ........... *F16M 13/00* (2013.01); *G06F 1/1616* (2013.01); *G06F 1/1626* (2013.01);
  (Continued)

(58) Field of Classification Search
  CPC .... G06F 1/1652; G06F 1/1616; G06F 1/1681; G06F 1/1641; G06F 1/1626;
  (Continued)

(56) References Cited

U.S. PATENT DOCUMENTS 6,577,496 B1 *  6/2003  Gioscia ................. G06F 1/1616
                                                            345/156
7,408,698 B2 *  8/2008  Kuo ....................... G06F 1/1601
                                                            204/450
(Continued)

FOREIGN PATENT DOCUMENTS

KR    10-2011-022893 A    3/2011
KR    10-2012-0089077 A   8/2012
(Continued)

OTHER PUBLICATIONS

Abstract of Korean Publication No. 10-2013-0073331, Corresponding to Korean Patent No. 10-1346146 B1, dated Dec. 31, 2013, 1 page.

*Primary Examiner* — Jonathan Liu
*Assistant Examiner* — Taylor L Morris
(74) *Attorney, Agent, or Firm* — Lewis Roca Rothgerber Christie LLP

(57) ABSTRACT

An apparatus for supporting a display panel includes: first and second supports configured to support the display panel, the first and second supports being rotatable about a rotation axis; a first frame coupled to a side of the first support and configured to be rotated with the first support; and a second frame coupled to a side of the second support and configured to be rotated with the second support, wherein the first support includes a first supporting pin having ends coupled to the first frame and being parallel to the rotation axis, and first and second support plates at opposite sides of the first supporting pin, wherein the first supporting plate is pivotably coupled to the first supporting pin.

16 Claims, 8 Drawing Sheets

(52) U.S. Cl.
CPC .......... *G06F 1/1641* (2013.01); *G06F 1/1652* (2013.01); *F16M 11/38* (2013.01); *F16M 2200/08* (2013.01); *G06F 1/1681* (2013.01)

(58) Field of Classification Search
CPC .. H04M 1/0216; H04M 1/0268; H04M 1/022; H04M 1/0247; G09F 9/301
USPC ................. 248/309.1, 918, 919; 361/679.01, 361/679.04, 679.27, 679.06, 679.09, 361/679.21, 730, 749; 345/1.1, 1.3
See application file for complete search history.

(56) References Cited

U.S. PATENT DOCUMENTS

| | | | | |
|---|---|---|---|---|
| 7,539,526 | B2* | 5/2009 | Pirila | G06F 1/1616 455/575.1 |
| 7,714,801 | B2* | 5/2010 | Kimmel | G06F 1/1616 345/1.3 |
| 7,869,204 | B2* | 1/2011 | Bair | G06F 1/1616 285/382.7 |
| 8,539,705 | B2* | 9/2013 | Bullister | G06F 1/1615 345/1.1 |
| 8,662,731 | B2* | 3/2014 | Wang | G09F 9/30 349/61 |
| 8,757,908 | B2* | 6/2014 | Wu | G06F 3/0221 345/1.3 |
| 8,938,856 | B1* | 1/2015 | Shin | E05D 3/06 16/365 |
| 9,173,288 | B1* | 10/2015 | Kim | G06F 1/1633 |
| 9,243,432 | B2* | 1/2016 | Lee | E05D 3/06 |
| 9,348,450 | B1* | 5/2016 | Kim | G06F 1/1681 |
| 9,470,404 | B2* | 10/2016 | Lee | F21V 21/30 |
| 9,535,452 | B2* | 1/2017 | Ahn | H05K 5/0017 |
| 9,910,458 | B2* | 3/2018 | Watanabe | G06F 1/1652 |
| 2003/0218860 | A1* | 11/2003 | Shiraiwa | G06F 1/1616 361/679.04 |
| 2006/0139862 | A1* | 6/2006 | Wang | G06F 1/1616 361/679.3 |
| 2008/0024388 | A1* | 1/2008 | Bruce | G06F 1/1616 345/1.1 |
| 2008/0054149 | A1* | 3/2008 | Freebairn | F16M 11/38 248/346.02 |
| 2010/0079355 | A1* | 4/2010 | Kilpatrick, II | G06F 1/1616 345/1.3 |
| 2010/0201604 | A1* | 8/2010 | Kee | G06F 1/1616 345/1.3 |
| 2011/0063783 | A1* | 3/2011 | Shim | G06F 1/1615 361/679.01 |
| 2011/0304983 | A1* | 12/2011 | Senatori | G06F 1/1616 361/679.55 |
| 2012/0038570 | A1* | 2/2012 | Delaporte | G06F 1/1616 345/173 |
| 2012/0044620 | A1* | 2/2012 | Song | G06F 1/1616 361/679.01 |
| 2012/0194456 | A1* | 8/2012 | Fujii | G06F 1/1624 345/173 |
| 2012/0200991 | A1* | 8/2012 | Ryu | G06F 1/1601 361/679.01 |
| 2012/0236476 | A1* | 9/2012 | Wu | G06F 1/1624 361/679.01 |
| 2012/0236484 | A1* | 9/2012 | Miyake | G06F 1/1616 361/679.01 |
| 2012/0236509 | A1* | 9/2012 | Cope | G02F 1/133305 361/730 |
| 2012/0264489 | A1* | 10/2012 | Choi | H04M 1/0216 455/566 |
| 2012/0275089 | A1* | 11/2012 | Alameh | H04M 1/0254 361/679.01 |
| 2013/0010405 | A1* | 1/2013 | Rothkopf | H04M 1/0216 361/679.01 |
| 2013/0021762 | A1* | 1/2013 | van Dijk | G06F 1/1652 361/749 |
| 2013/0037228 | A1* | 2/2013 | Verschoor | G06F 1/1652 160/377 |
| 2013/0314611 | A1* | 11/2013 | Okutsu | H04N 5/64 348/739 |
| 2014/0042293 | A1* | 2/2014 | Mok | G06F 1/1652 248/682 |
| 2014/0104765 | A1* | 4/2014 | Hoshino | G06F 1/1681 361/679.01 |
| 2014/0111954 | A1* | 4/2014 | Lee | G06F 1/1641 361/749 |
| 2015/0062927 | A1* | 3/2015 | Hirakata | H01L 51/0097 362/362 |
| 2015/0233162 | A1 | 8/2015 | Lee et al. | |
| 2015/0257290 | A1* | 9/2015 | Lee | H04M 1/0216 361/749 |
| 2015/0261259 | A1* | 9/2015 | Endo | G06F 1/1652 361/679.06 |
| 2015/0330614 | A1* | 11/2015 | Lee | F21V 21/30 362/97.1 |
| 2015/0366089 | A1* | 12/2015 | Park | G06F 1/1652 361/679.01 |
| 2016/0085271 | A1* | 3/2016 | Morrison | G06F 1/1681 361/679.27 |
| 2016/0150657 | A1* | 5/2016 | Myeong | H04M 1/0268 361/749 |
| 2017/0365197 | A1* | 12/2017 | Kim | G09F 9/301 |

FOREIGN PATENT DOCUMENTS

| | | |
|---|---|---|
| KR | 10-2013-0062210 A | 6/2013 |
| KR | 10-1329946 B1 | 11/2013 |
| KR | 10-1346146 B1 | 12/2013 |

* cited by examiner

α≤β

APPARATUS FOR SUPPORTING DISPLAY PANEL

CROSS-REFERENCE TO RELATED APPLICATION

This application claims priority to and the benefit of Korean Patent Application No. 10-2014-0156101, filed in the Korean Intellectual Property Office on Nov. 11, 2014, the entire content of which is incorporated herein by reference.

BACKGROUND

1. Field

The present disclosure relates to an apparatus for supporting a display panel.

2. Description of the Related Art

Some current display devices include a liquid crystal display (LCD), a plasma display panel (PDP), an organic light emitting diode (OLED) display device, a field effect display (FED), an electrophoretic display device, and the like.

An OLED display device generally includes two electrodes and an organic emission layer positioned therebetween. Electrons injected from one of the electrodes and holes injected from the other electrode are coupled with each other in the organic emission layer to generate excitons, and the excitons emit energy to emit light.

Because the OLED display device has a self-luminance characteristic and does not require a separate light source, unlike the LCD, thickness and weight thereof may be reduced compared to the LCD. Further, because the OLED display device has high-grade characteristics, such as low power consumption, high luminance, and a high response speed, the OLED display device has received attention as a next-generation display device.

Recently, a flexible display device in which the display device may be bent or folded has been developed.

However, as shown in FIGS. 1A-C, in a process in which the display panel is bent or folded at an angle, a problem that the display panel is lifted (e.g., is lifted off the supporting apparatus or is wrinkled) may occur as shown, for example, in FIG. 1B.

The above information disclosed in this Background section is only for enhancement of understanding of the background of the invention, and therefore, it may contain information that does not form the prior art that is already known to a person of ordinary skill in the art.

SUMMARY

An exemplary embodiment of the present invention provides an apparatus for supporting (e.g., a supporting apparatus for) a display panel that reduces or prevents the display panel from being lifted from supporting apparatus during a process of bending or folding the display panel.

An apparatus for supporting a display panel configured to display an image and being bendable or foldable about an axis according to an exemplary embodiment includes: first and second supports configured to support the display panel, the first and second supports being rotatable about a rotation axis; a first frame coupled to a side of the first support and configured to be rotated with the first support; and a second frame coupled to a side of the second support and configured to be rotated with the second support. The first support includes: a first supporting pin having ends coupled to the first frame, an axis of the first supporting pin being parallel to the rotation axis; a first supporting plate between the first supporting axis and the rotation axis and pivotably coupled to the first supporting pin; and a second supporting plate coupled to the first supporting pin and positioned at an opposite side of the first supporting pin with respect to the first supporting plate.

When the second supporting plate is rotated with respect to a reference surface at which the first and second frames are horizontal, the first supporting plate may be rotated with respect to the axis of the first supporting pin to form a second rotation angle between the first supporting plate and the second supporting plate that is greater than or equal to a first rotation angle between the reference surface and the second supporting plate.

The second support may be rotated within an angle range that may from about 0 degree to about 15 degrees.

The second support may include: a second supporting pin having ends coupled to the second frame, an axis of the second supporting pin being parallel to the rotation axis; a third supporting plate between the second supporting pin and the rotation axis and pivotably coupled to the second supporting pin; and a fourth supporting plate coupled to the second supporting pin and positioned at an opposite side of the second supporting pin with respect to the third supporting plate.

When the fourth supporting plate is rotated with respect to the reference surface, the third supporting plate may be rotated about the second supporting axis to form a fourth rotation angle between the third supporting plate and the fourth supporting plate that is greater than or equal to a third rotation angle between the reference surface and the fourth supporting plate.

The apparatus may further include a holder under ends of the first and third supporting plates adjacent to the rotation axis and configured to support the ends of the first and third supporting plates.

When the second and fourth supporting plates are rotated, the holder may be configured to move away from the ends of the first and third supporting plates.

The second supporting plate and the first frame may be rotated at the same angle.

When the second supporting plate is rotated, the first supporting pin may be configured to move with respect to the first frame.

The first supporting pin may be configured to move in a direction away from the rotation axis.

Guide parts may be at the first frame and coupled to respective ends of the first supporting pin.

The guide part may have an oblong shape.

The guide part may be have a groove shape.

The guide part may be a through-hole.

According to the apparatus for supporting the display panel according to an exemplary embodiment of the present invention, the display panel remains close to (e.g., in contact with) the supporting part supporting the display panel during the process of bending and folding the display panel, thereby preventing or reducing the display panel from being lifted from the supporting part.

BRIEF DESCRIPTION OF THE DRAWINGS

FIG. 1B shows a bending process in which the display panel is lifted from a supporting apparatus. FIG. 1C shows a bending process in which the display panel is not lifted from the supporting apparatus.

DETAILED DESCRIPTION

Figure 1A:
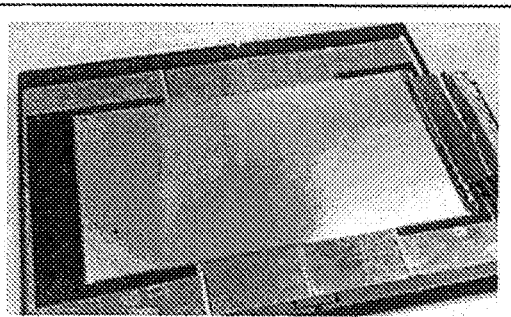
FIGS. 1A-C show a bending or folding process of a display panel.
Figure 1B:
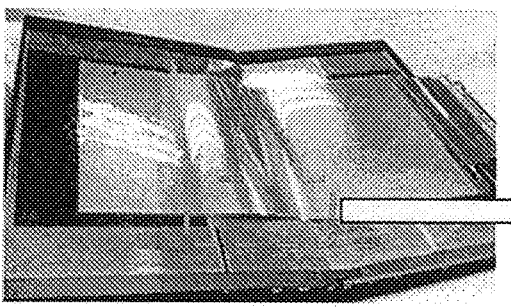
Figure 1C:
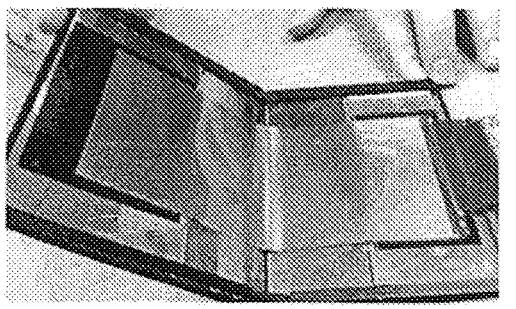

Hereinafter, exemplary embodiments of the present invention will be described in detail with reference to the accompanying drawings. As those skilled in the art would realize, the described embodiments may be modified in various different ways, all without departing from the spirit or scope of the present invention. Exemplary embodiments introduced herein are provided to make disclosed contents thorough and complete and sufficiently transfer the spirit of the present invention to those skilled in the art.

It will be understood that when an element or layer is referred to as being "on", "connected to", or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention". Expressions, such as "at least one of," when preceding a list of elements, modify the entire list of elements and do not modify the individual elements of the list. Also, the term "exemplary" is intended to refer to an example or illustration. In the drawings, the thickness of layers, films, panels, regions, etc., may be exaggerated for clarity.

It will be understood that, although the terms first, second, third, etc. may be used, herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly. As used herein, the terms "use," "using," and "used" may be considered synonymous with the terms "utilize," "utilizing," and "utilized," respectively.

The terminology used herein is for the purpose of describing particular example embodiments only and is not intended to be limiting of example embodiments. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 2:
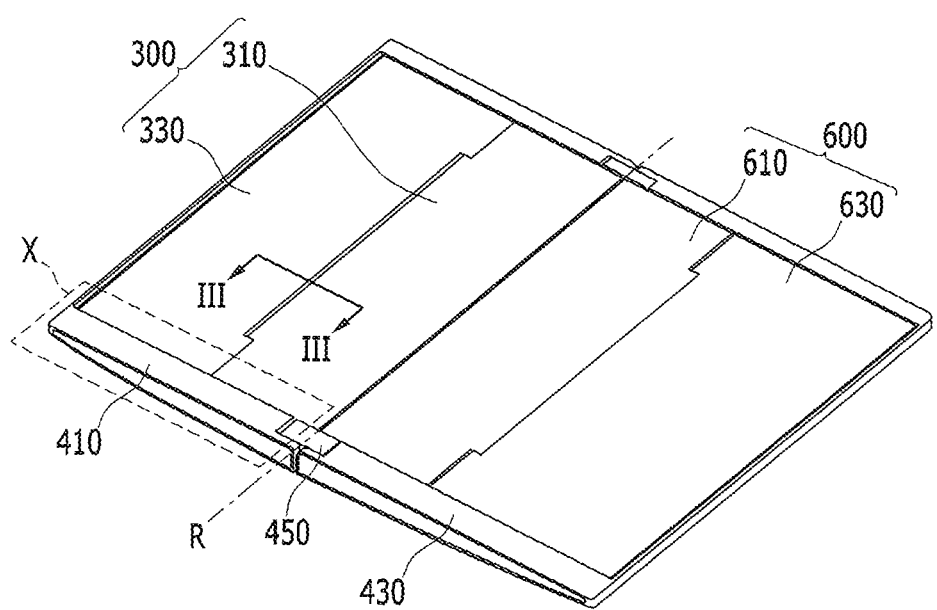
FIG. 2 is a schematic perspective view of an apparatus for supporting a display panel according to a first exemplary embodiment of the present invention.
Figure 3:
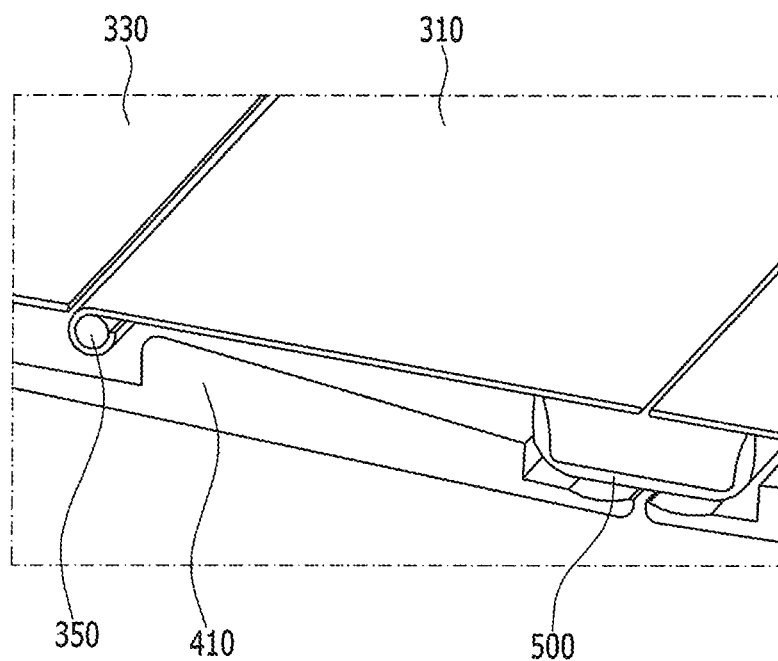
FIG. 3 is a perspective view of the supporting apparatus shown in FIG. 2 taken along the line of FIG. 2.
Figure 4:
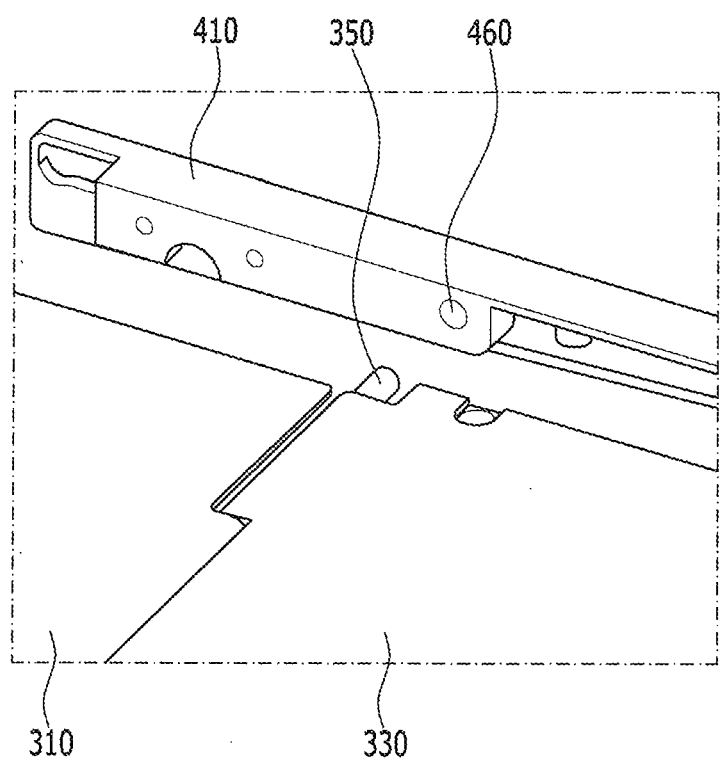
FIG. 4 is an exploded perspective view of the region X of FIG. 2.

Referring to FIG. 2 to FIG. 4, in an apparatus for supporting (e.g., a supporting apparatus) a display panel according to a first exemplary embodiment of the present invention, the display panel is prevented from being lifted from a supporting plate of the supporting apparatus when first and/or second supporting parts of the supporting apparatus are rotated (e.g., pivoted) (e.g., rotated or pivoted within a predetermined range).

Referring to FIG. 2, in the apparatus for supporting the display panel according to the first exemplary embodiment of the present invention, at least one of the first and second supporting parts 300 and 600 (e.g., the first and second supports) for supporting the display panel) may be rotated about (e.g., with reference to) a rotation axis R. By rotating the first and/or second supporting parts 300 and 600, the display panel supported by the first and second supporting parts 300 and 600 may be bent or folded.

The apparatus for supporting the display panel according to the first exemplary embodiment may include the first and second supporting parts 300 and 600 and first and second frames 410 and 430.

In this embodiment, the display panel may display an image. The display panel may be, for example, an organic light emitting diode (OLED) display device or a liquid crystal display (LCD).

In this embodiment, referring to FIG. 2 and FIG. 3, the first and second supporting parts 300 and 600 may be disposed at respective sides of the rotation axis R (e.g., the first and second supporting parts 300 and 600 may be at respective sides of the rotation axis R such that the rotation axis R extends between the first and second supporting parts 300 and 600).

According of the first exemplary embodiment of the present invention, the first supporting part 300 supporting the display panel may include a first supporting pin 350 having a first supporting axis that extends therethrough and first and second supporting plates 310 and 330.

Referring to FIG. 4, the first supporting pin 350 is coupled to the first frame 410, and the first supporting axis is parallel to the rotation axis R. In this embodiment, the first supporting pin 350 is inserted into a guide part 460 (e.g., an opening or a hole) formed at (e.g., in) the first frame 410.

The guide part 460 may have a shape corresponding to a cross-section of the inserted first supporting pin 350. In this embodiment, the guide part 460 may have an insertion groove shape or a penetrating hole shape.

Referring to FIG. 3, the first and second supporting plates 310 and 330 are coupled to the first supporting pin 350.

The first supporting plate 310 is positioned between the first supporting pin 350 and the rotation axis R. In this embodiment, the first supporting plate 310 is coupled to be pivoted about (e.g., pivot-rotated with reference to) the first supporting pin 350.

In this embodiment, by pivoting the first supporting plate 310 about the first supporting axis, the supported display panel may be prevented from being lifted during the bending process. The detailed description thereof will be further described later.

Also, the second supporting plate 330 is positioned at an opposite side of the first supporting axis with reference to the first supporting plate 310. The second supporting plate 330 may also be pivoted about (e.g., pivot-rotated with reference to) the first supporting axis, or may be pivoted to the first supporting pin 350.

For example, the first and second supporting plates 310 and 330 are disposed to extend in parallel with the first supporting axis. Also, the first supporting plate 310 may be rotated about the first supporting axis.

The first and second supporting plates 310 and 330 may have a plate shape. As shown in FIG. 2, when the first supporting part 300 and the second supporting part 600 are disposed in parallel (e.g., are disposed to be aligned), the first and second supporting plates 310 and 330 may form a flat surface (e.g., a continuous flat surface).

Also, the second supporting part 600 supporting the display panel may include a second supporting pin having a second supporting axis extending therethrough and third and fourth supporting plates 610 and 630.

In this embodiment, the second supporting pin and the third and fourth supporting plates of the second supporting part 600 respectively correspond to the first supporting pin and the first and second supporting plates of the first supporting part 300.

For example, as shown in FIG. 2, the second supporting part 600, including the second supporting pin and the third and fourth supporting plates 610 and 630, and the first supporting part 300, including the first supporting pin and the first and second supporting plates 310 and 330, are symmetrical to each other about the rotation axis R.

Referring to FIG. 2, the second supporting pin is coupled to the second frame 430, and the second supporting axis extends in parallel with the rotation axis R. The second supporting axis is at the opposite side of the rotation axis R from the first supporting axis.

Also, the second supporting pin is inserted into a guide part formed at (e.g., in) the second frame 430.

Similar to the guide part 460 of the first frame 410, the guide part of the second frame 430 may have a shape corresponding to the cross-section of the second supporting pin. In this embodiment, the guide part of the second frame 430 may have the insertion groove shape or the penetrating hole shape.

Again referring to FIG. 2, the third and fourth supporting plates 610 and 630 are coupled to the second supporting pin.

The third supporting plate 610 is positioned between the second supporting pin and the rotation axis R. In this embodiment, the third supporting plate 610 is coupled to be pivoted about (e.g., pivot-rotated with reference to) the second supporting axis.

In this embodiment, similar to the above-described first supporting plate 310, by pivoting the third supporting plate 610 about the second supporting axis, the supported display panel may be prevented from being lifted during the bending process. The detailed description thereof will be further described below.

Also, the fourth supporting plate 630 is positioned opposite to the third supporting plate 610 about the second supporting axis. In this embodiment, the fourth supporting plate 630 may be pivoted about the second supporting axis or may be fixed to the second supporting pin.

For example, the third and fourth supporting plates 610 and 630 are disposed in parallel with the second supporting axis. Further, the third supporting plate 610 may be rotated about the second supporting axis.

The third and fourth supporting plates 610 and 630 may have the plate shape. As shown in FIG. 2, when the first supporting part 300 and the second supporting part 600 are disposed in parallel (e.g., when the second supporting part is not pivoted), the third and fourth supporting plates 610 and 630 form a flat surface (e.g., a continuous flat surface). In this embodiment, the first to fourth supporting plates 310, 330, 610, and 630 may form a, flat surface (e.g., a continuous flat surface).

Referring to FIG. 2 and FIG. 4, the first frame 410 is coupled to the first supporting pin 350 as described above. Also, as shown in FIG. 2, the first frame 410 may receive (e.g., accommodate) the first supporting part 300.

In this embodiment, the first frame 410 may have the shape corresponding to the shape of the first and second supporting plates 310 and 330. For example, the first frame 410 may be formed as a frame having a quadrangular shape. Also, the first frame 410 may have the frame shape of which a rear surface is blocked or covered.

The first frame 410 may be rotated with reference to the rotation axis R along with the first supporting part 300. For example, in the state in which the first frame 410 receives the first supporting part 300, the first frame 410 may be rotated along with the first supporting part 300.

Referring to FIG. 4, because the first supporting pin 350 of the first supporting part 300 is coupled to the first frame 410, the first supporting part 300 and the first frame 410 may be rotated together.

However, as described above, although the first supporting part 300 and the first frame 410 are rotated together, the first supporting plate 310 of the first supporting part 300 may be pivoted about the first supporting axis.

As described above, the second frame 430 is coupled to the second supporting pin. Also, as shown in FIG. 2, the second frame 430 may receive the second supporting part 600.

In this embodiment, the second frame 430 may have the shape corresponding to the shape of the third and fourth supporting plates 610 and 630. For example, the second frame 430 may be formed as the frame with the quadrangle shape. Also, the frame 430 may have the frame shape of which the rear surface is blocked.

The second frame 430 may be rotated with reference to the rotation axis R along with the second supporting part 600. For example, similar to the first frame 410, in the state in which the second frame 430 receives the second supporting part 600, the second frame 430 may be rotated along with the second supporting part 600.

Referring to FIG. 4, because the second supporting pin is coupled to the second supporting part 600 and to the second frame 430, the second supporting part 600 and the second frame 430 may be rotated together.

However, as described above, although the second supporting part 600 and the second frame 430 are rotated together, the third supporting plate 610 of the second supporting part 600 may be pivoted about the second supporting axis.

Hereinafter, an operation principle of rotating the first supporting part 300 and/or the second supporting part 600 with reference to the rotation axis R while preventing the supported display panel from being lifted will be described in further detail.

Before further describing the operation principle of the first and second supporting parts 300 and 600, the lifting of the display panel when bending the display panel using certain methods will be described.

Figure 5:
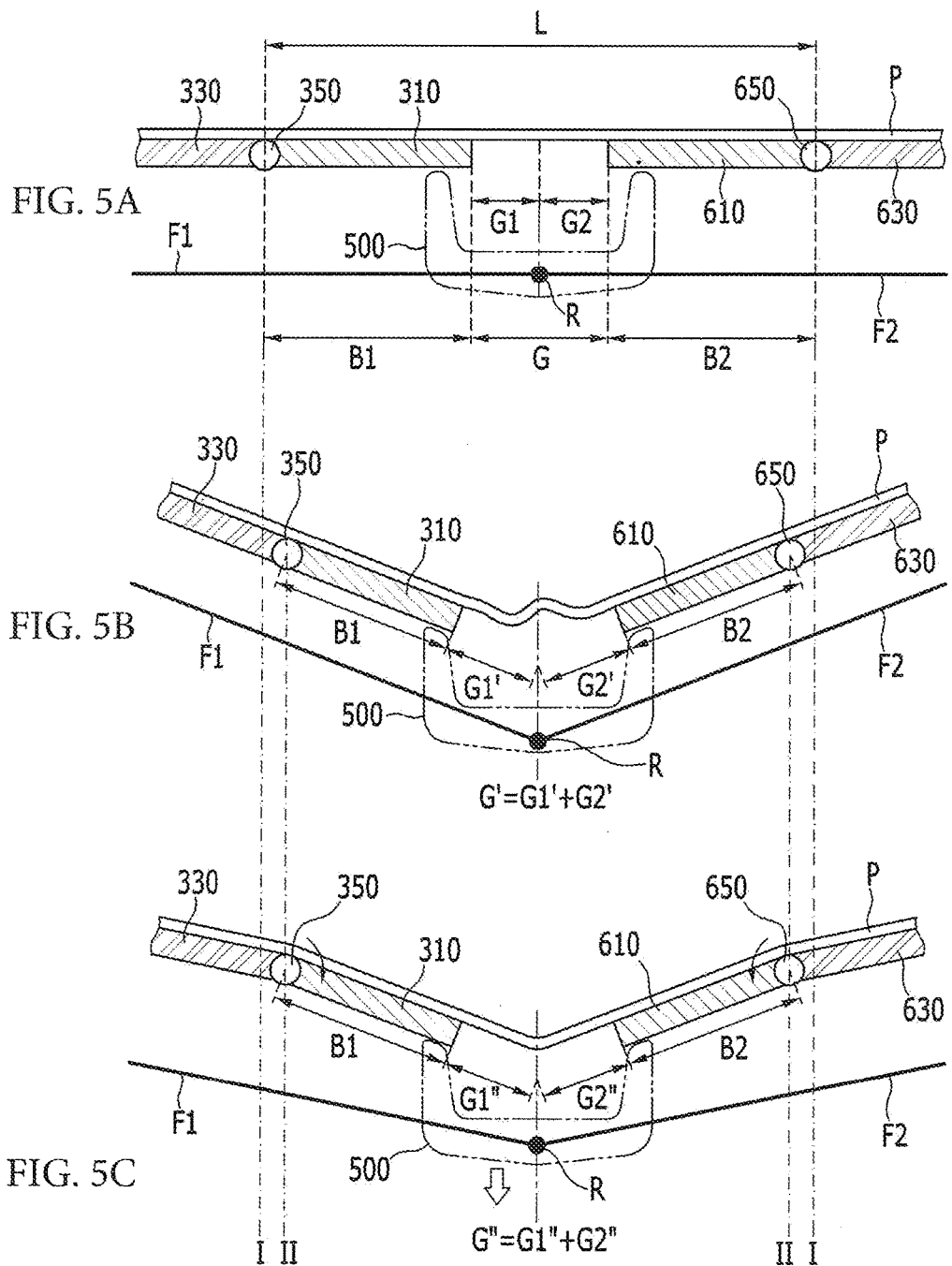
FIG. 5A is a cross-sectional view of the apparatus for supporting the display panel according to the first exemplary embodiment of the present invention.
FIG. 5B is a cross-sectional view of an operation of the apparatus for supporting the display panel in such a way that causes lifting of the display panel.
FIG. 5C is a cross-sectional view of an operation of the apparatus for supporting the display panel in such a way that does not cause lifting of the display panel.

FIG. 5A is an cross-sectional view illustrating a display panel P in a horizontal state. For example, the first and second supporting plates 310 and 330 of the first supporting part 300 are illustrated in a horizontal cross-section and the third and fourth supporting plates 610 and 630 of the second supporting part 600 are also illustrated in a horizontal cross-section.

In FIGS. 5A-C, the first and second frames are simply indicated by solid lines F1 and F2, respectively, for convenience of illustration.

Also, in FIGS. 5A-C, a line where the first and second frames F1 and F2 meet each other corresponds to the rotation axis R shown in FIG. 2. That is, the first and second frames F1 and F2 may be rotated with reference to (e.g., pivoted about) the rotation axis R.

In FIG. 5A, the first supporting plate 310 and the third supporting plate 610 are positioned to be separated by a separation distance G.

In this embodiment, the separation distance G is represented by a sum of a first interval G1 and a second interval G2. The first interval G1 is a distance from one end of the first supporting plate 310 to the axis vertical to the rotation axis R in the extension direction of the first supporting plate 310. The second interval G2 is a distance from one end of the third supporting plate 610 to the axis vertical to the rotation axis R in the extension direction of the third supporting plate 610.

Lengths of the first supporting plate 310 and the third supporting plate 610 are respectively indicated by B1 and B2.

Also, the length of the display panel P disposed on the first supporting plate 310 and the third supporting plate 610 (e.g., disposed between the first supporting pin 350 and the second supporting pin 650) is indicated by the reference numeral L. However, for ease of describing the apparatus for supporting the display panel according to an exemplary embodiment of the present invention, the thickness of the illustrated display panel P may be arbitrarily indicated.

As shown in FIG. 5A, in the state in which the display panel P is horizontally disposed (e.g., is flat, or is not bent or folded), the length L of the display panel P is the sum of the length B1 of the first supporting plate 310, the length B2 of the third supporting plate 610, and the separation distance G. That is, the length L is satisfied by the equation L=B1+B2+G.

As described above, when the length L of the display panel P is the same as B1+B2+G, the display panel P is not lifted. For example, as shown in FIG. 5A, the display panel P is disposed to be close to (e.g., contacts) the first and third supporting plates 310 and 610.

However, when the first supporting part 300 and/or the second supporting part 600 are rotated (e.g., rotated within the predetermined angle range) with reference to the rotation axis R, the display panel P may be lifted from the first and second supporting parts 300 and 600.

Referring to FIG. 5B, when the first or second supporting parts 300 and 600 are rotated with reference to the rotation axis R using a certain method (e.g., when the first and second supporting parts 300 and 600 remain flat, respectively), the display panel P is bent or folded.

In this case, as described above, the rotation axis R corresponds to the line where the first and second frames F1 and F2 illustrated in FIG. 5A meet each other. For example, the rotation axis of the first or second supporting parts 300 and 600 is separated from and positioned under a straight line parallel to the extension direction of the first and third supporting plates 310 and 610 illustrated in FIG. 5A.

When the rotation axis of the first or second supporting parts 300 and 600 is positioned where the first and third supporting plates 310 and 610 extend and meet as illustrated in FIG. 5A, although the first and/or second supporting part 300 and/or 600 is rotated with reference to the rotation axis, the display panel P may be lifted.

This is because the first interval G1' and the second interval G2' are the same as the first interval G1 and the second interval G2 of FIG. 5A, although the first or second supporting parts 300 and 600 are rotated. Accordingly, the separation distance G remains constant in spite of the rotation such that the length L of the display panel P is equal to the sum of the length B1 of the first supporting plate 310, the length B2 of the third supporting plate 610, and the separation distance (G'=G1'+G2').

However, according to the first exemplary embodiment of the present invention, the first and/or second supporting parts 300 and/or 600 are rotated with reference to the rotation axis R (e.g., the position where the first and second frames F1 and F2 meet each other) differently from the above description.

FIG. 5B shows that the display panel P is lifted when the first and/or second supporting parts 300 and/or 600 are rotated with reference to the rotation axis R.

FIG. 5B shows the operation in which the first and second supporting parts 300 and 600 are concurrently (e.g., simultaneously) rotated with reference to the rotation axis R. However, the operation is not limited thereto, and only the first supporting part 300 may be rotated.

Referring to FIG. 5B, the first supporting part 300, that is, the first supporting plate 310 and the second supporting plate 330, are rotated in a clockwise direction with reference to the rotation axis R. The second supporting part 600, that is, the third supporting plate 610 and the fourth supporting plate 630, are rotated in a counterclockwise direction with reference to the rotation axis R.

In this case, an angle α (referring to FIG. 6) at which the first supporting part 300 is rotated with reference to the rotation axis R is the same or substantially the same as an angle of the first and second supporting plates 310 and 330 with respect to the reference surface M1 (referring to FIG. 6) at which the first and second frames F1 and F2 are horizontally disposed when not rotated.

Also, the angle at which the second supporting part 600 is rotated with reference to the rotation axis R is the same as the angle of the third and fourth supporting plates 610 and 630 with respect to the reference surface M1.

As shown in FIG. 5B, when the first and second supporting parts 300 and 600 are rotated (e.g., rotated within the predetermined angle range), the display panel P supported by the first and second supporting parts 300 and 600 is lifted. However, as shown in FIG. 5C, in the supporting apparatus according to the first exemplary embodiment, the first and second supporting parts 300 and 600 deviate from the angle formed between the first and second frames F1 and F2, so the lifting of the display panel P is reduced.

In this embodiment, the angle range (e.g., the predetermined angle range) is from greater than 0 degree to less than 15 degrees. Stated differently, when the first and second supporting parts 300 and 600 are rotated greater than 15 degrees with reference to the rotation axis R, a possibility that the display panel P is lifted is reduced compared to the conventional supporting apparatus.

For example, when the first and second supporting plates 310 and 330 are rotated with reference to the rotation axis R, the first interval G1' is less than the first interval G1. Also, when the third and fourth supporting plates 610 and 630 are rotated, the second interval G2' is less than the second interval G2.

For example, when the first and second supporting parts 300 and 600 are rotated within the angle range, the first and second intervals G1' and G2' are smaller than the first and second intervals G1 and G2 before the first and second supporting parts 300 and 600 are rotated.

Accordingly, the separation distance G', being the sum of the first and second intervals G1' and G2', is also less than the separation distance G before the first and second supporting parts 300 and 600 are rotated (e.g., (G'<G)). The sum of the length B1 of the first supporting plate 310, the length B2 of the third supporting plate 610, and the separation distance G' is less than the length L of the display panel P. Accordingly, as shown in FIG. 5B, the portion of the display panel P is lifted.

According to the first exemplary embodiment of the present invention, to reduce the lifting of the portion of the display panel P as shown in FIG. 5B, the separation distance G" is greater than the separation distance G'. For example, when the separation distance G" is the same as the separation distance G before the first and second supporting parts 300 and 600 are rotated, the display panel P is prevented from being lifted.

According to the first exemplary embodiment of the present invention, as shown in FIG. 5C, the first supporting plate 310 is rotated in the clockwise direction with reference to the first supporting axis, and the third supporting plate 610 is rotated in the counterclockwise direction with reference to a second supporting axis. As described above, when the first and third supporting plates 310 and 610 are rotated, the separation distance G" is greater than the separation distance G'.

Comparing FIG. 5B with FIG. 5C, when the first supporting plate 310 is rotated, the first interval G1", that is, the distance from one side of the first supporting plate 310 to the axis vertical to the rotation axis R, is greater than the first interval G1' in the extension direction of the first supporting plate 310.

When the third supporting plate 610 is rotated, the second interval G2", the distance from one side of the third supporting plate 610 to the axis vertical to the rotation axis R, is greater than the second interval G2' in the extension direction of the third supporting plate 610.

As described above, by rotating the first and third supporting plates 310 and 610 with reference to the first and second supporting axes such that the separation distance G" is greater than the separation distance G', the separation distance G" and the separation distance G may be the same or substantially the same.

However, according to the first exemplary embodiment of the present invention, the angle at which the first supporting plate 310 is rotated with reference to the first supporting axis should satisfy a condition as follows.

Figure 6:
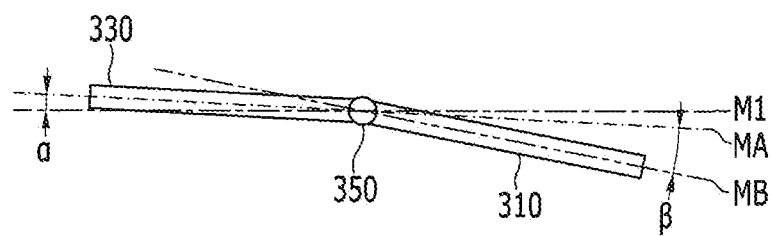
FIG. 6 is a view showing an angle formed by first and second supporting plates shown in FIG. 5C.

Referring to FIG. 6, the angle formed by the reference surface M1, at which the first and second frames F1 and F2 are horizontally disposed when not rotated, and the second supporting plate 330, indicated by MA, is referred to as a first rotation angle α. Also, the angle between the first supporting plate 310, indicated by MB, and the second supporting plate 330 (MA) is referred to as a second rotation angle β. In this embodiment, the angle (e.g., the second rotation angle β) between the first supporting plate 310 and the second supporting plate 330 is the same or is substantially the same as the angle at which the first supporting plate 310 is rotated with reference to the first supporting axis.

In this embodiment, according to the first exemplary embodiment of the present invention, the first rotation angle (α) is less than or equal to the second rotation angle (β).

For example, the second rotation angle β, the angle between the first supporting plate 310 and the second supporting plate 330, is greater than or equal to the first rotation angle α, the angle between the reference surface M1 and the second supporting plate 330.

When this condition is satisfied or substantially satisfied, although the first supporting part 300 is rotated, the separation distance G is not decreased, such that the display panel P may be prevented from being lifted.

According to the first exemplary embodiment of the present invention, a holder 500 supporting ends of the first and third supporting plates 310 and 610 may be further included. In this embodiment, the holder 500 is positioned under the ends of the first and third supporting plates 310 and 610.

Referring to FIG. 5A, when the display panel P is horizontally disposed, the ends of the first and third supporting plate 310 and 610 are supported by the holder 500.

However, referring to FIG. 5C, when the display panel P is bent, as described above, the holder 500 may be moved in a lower direction (e.g., in a direction away from the first and second supporting plates 310 and 610), such that the first and third supporting plates 310 and 610 may be respectively rotated with reference to the first and second supporting axes.

However, to rotate the first and third supporting plates 310 and 610 with reference to the first and second supporting axes, this embodiment of the present invention is not limited to the holder 500 being moved in the lower direction. For example, the holder 500 contacting the ends of the first and third supporting plates 310 and 610 may be formed with a shape, such as a chamfer, that is inclined in a direction (e.g., in a direction towards a center of the holder 500).

Figure 7:
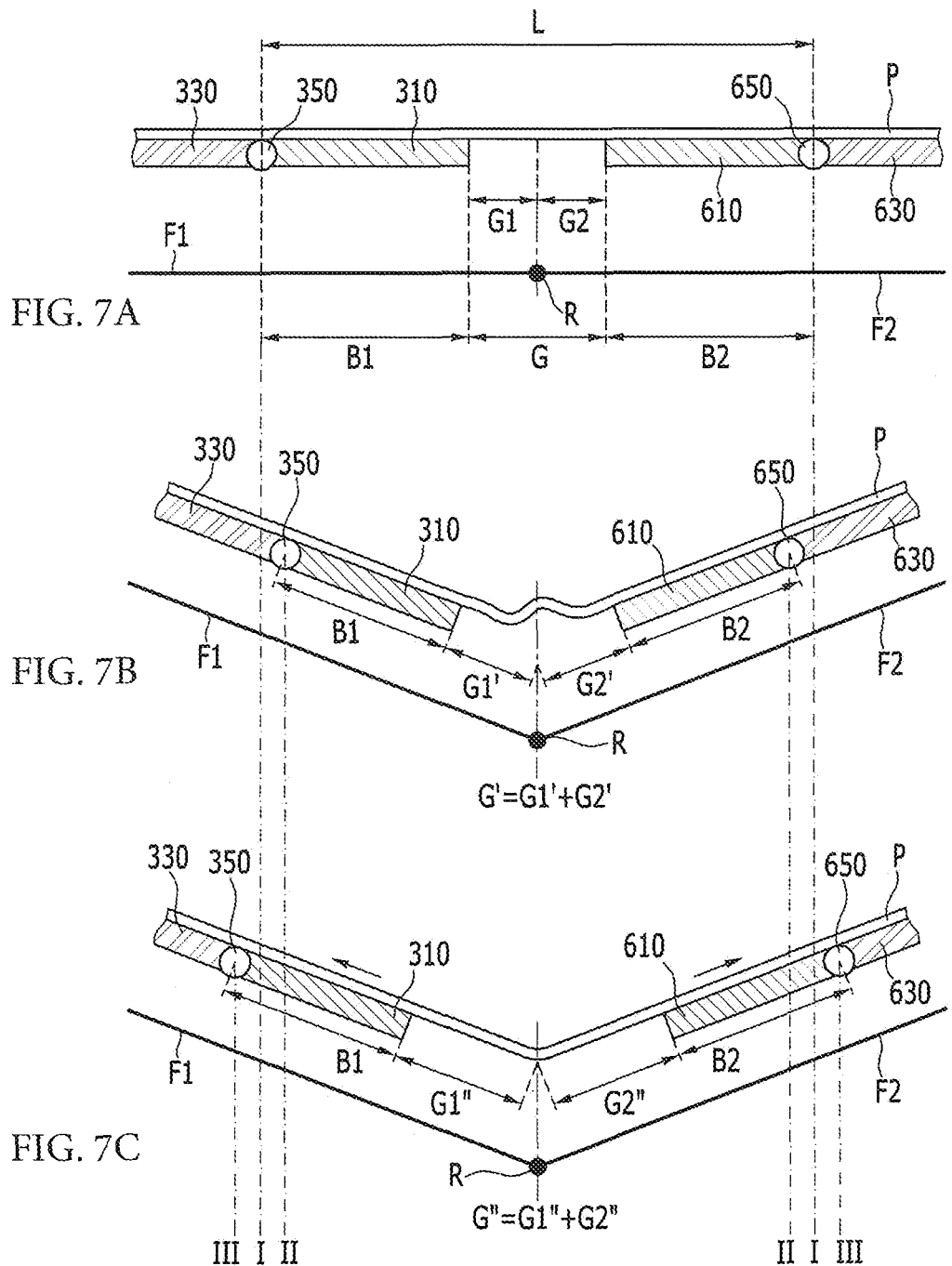
FIG. 7A is a cross-sectional view of the apparatus for supporting the display panel according to a second exemplary embodiment of the present invention.
FIG. 7B is a cross-sectional view of an operation of the apparatus for supporting the display panel in such a way that causes lifting of the display panel.
FIG. 7C is a cross-sectional view of an operation of the apparatus for supporting the display panel in such a way that does not cause lifting of the display panel.
Figure 8:
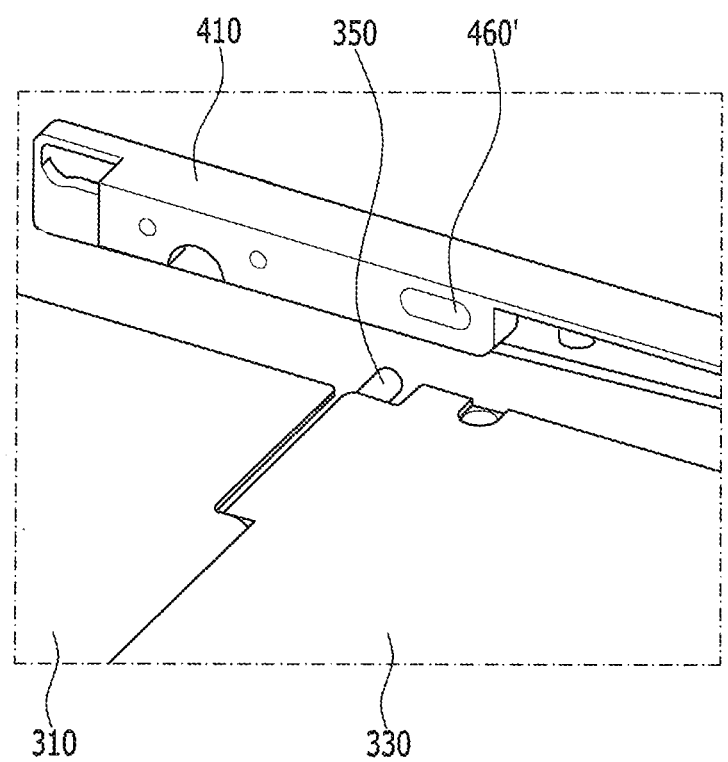
FIG. 8 is an exploded perspective view of a guide part of a supporting apparatus according to the second exemplary embodiment of the present invention.

FIG. 7A is a cross-sectional view of an apparatus for supporting a display panel according to a second exemplary embodiment of the present invention. FIG. 7B is a cross-sectional view of an operation of the apparatus for supporting the display panel in such a way that causes lifting of the display panel. FIG. 7C is a cross-sectional view of an operation of the apparatus for supporting the display panel in such a way that does not cause lifting of the display panel. FIG. 8 is a perspective view of a guide part of the supporting apparatus according to the second exemplary embodiment of the present invention.

Hereafter, the apparatus for supporting the display panel according to the second exemplary embodiment will be described with reference to FIG. 7 and FIG. 8. In the description of the supporting apparatus according to the second exemplary embodiment of the present invention, the detailed description of the same or similar elements of the supporting apparatus according to the first exemplary embodiment may be omitted.

The apparatus for supporting the display panel according to the second exemplary embodiment may include the first and second supporting parts 300 and 600 and the first and second frames 410 and 430, similar to the first exemplary embodiment.

As shown in FIG. 8, the first supporting pin 350 is coupled to the first frame 410 to be parallel to the rotation axis R.

According to the second exemplary embodiment of the present invention, the first supporting pin 350 may move with respect to the first frame 410 and/or may move within the guide part 460'.

Referring to FIG. 8, the first frame 410 includes a guide part 460' to be coupled with the first supporting pin 350. In this embodiment, the guide part 460' may have a slit shape (e.g., a groove shape).

Accordingly, the first supporting pin 350 may move with respect to the first frame 410.

In the first exemplary embodiment of the present invention, the guide part 460 is formed with the shape corresponding to the cross-section of the first supporting pin 350, thereby the first supporting pin 350 may be moved along with the first frame 410. That is, the first supporting pin 350 is fixed and coupled to the first frame 410.

However, the guide part 460' according to the second exemplary embodiment may be formed with the insertion groove shape or the penetrating hole shape.

Next, the operation principle of the supporting apparatus according to the second exemplary embodiment that prevents the supported display panel from being lifted when the first supporting part 300 and/or the second supporting part 600 are rotated with reference to the rotation axis R will be described in further detail.

FIGS. 7A and 7B illustrate similar operation principals as shown in FIGS. 5A and 5B, respectively, and describe the process in which the display panel P is lifted when the first and second supporting parts 300 and 600 are rotated with reference to the rotation axis R.

In the process described in FIGS. 7A and 7B, the separation distance G' shown in FIG. 7B is less than the separation distance G, such that, when the first and third supporting plates 310 and 610 are rotated with reference to the rotation axis R but are not rotated with respect to the first and second supporting axes, the display panel P may be lifted. However, the lifting of the display panel P can be reduced or prevented by increasing the separation distance G'.

Referring to FIG. 7C, in the second exemplary embodiment of the present invention, the first supporting pin 350 moves with respect to the first frame F1 to increase the separation distance G".

For example, to increase the separation distance G", the first supporting pin 350 is moved in an outside direction of the first frame F1 with respect to the rotation axis R (e.g., in a direction away from the third supporting plate 610). When the first supporting pin 350 is moved in the outside direction with reference to the rotation axis R, the first interval G1" is greater than the first interval G1' shown in FIG. 7B.

Likewise, when the second supporting pin 650 is moved in the outside direction of the second frame F2 with respect to the rotation axis R (e.g., in a direction away from the first supporting plate 310), the second interval G2" is greater than the second interval G2' shown in FIG. 7B.

Accordingly, the separation distance G" shown in FIG. 7C is greater than the separation distance G' shown in FIG. 7B, thereby preventing the display panel P from being lifted.

It is described above that the first and second supporting pins 350 and 650 respectively move with respect to the first and second frames F1 and F2, respectively. However, the second exemplary embodiment of the present invention is not limited thereto, and only one of the first or second supporting pins 350 or 650 may move with respect to the first or second frame F1 and F2.

The apparatus for supporting the display panel according to an exemplary embodiment may prevent the display panel from being lifted from the supporting apparatus when the display panel is bent or lifted.

While this invention has been described in connection with what is presently considered to be practical exemplary embodiments, it is to be understood that the invention is not limited to the disclosed embodiments but is intended to cover various modifications and equivalent arrangements included within the spirit and scope of the appended claims and their equivalents.

| Description of Some Reference Symbols | |
|---|---|
| 300 first supporting part | 310 first supporting plate |
| 330 second supporting plate | 350 first supporting axis |
| 410 first frame | 430 second frame |
| 500 holder | 600 second supporting part |
| 610 third supporting plate | 630 fourth supporting plate |
| 650 second supporting axis | |

What is claimed is:

1. An apparatus for supporting a display panel, the apparatus comprising:
    first and second supports configured to support the display panel, the first and second supports being rotatable about a rotation axis;
    a first frame coupled to a side of the first support and configured to be rotated with the first support; and
    a second frame coupled to a side of the second support and configured to be rotated with the second support,
    wherein the first support comprises:
        a first supporting pin having ends coupled to the first frame, an axis of the first supporting pin being parallel to the rotation axis;
        a first supporting plate between the first supporting pin and the rotation axis and pivotably coupled to the first supporting pin; and a second supporting plate coupled to the first supporting pin and positioned at an opposite side of the first supporting pin with respect to the first supporting plate, and wherein, when the first and second supporting plates are rotated in a first direction about the rotation axis, the second supporting plate rotates in a second direction opposite the first direction about the axis of the first supporting pin.

2. The apparatus of claim 1, wherein, when the second supporting plate is rotated with respect to a reference surface at which the first and second supporting plates are horizontal, the first supporting plate is rotated with respect to the axis of the first supporting pin to form a second rotation angle between the first supporting plate and the second supporting plate that is greater than or equal to a first rotation angle between the reference surface and the second supporting plate.

3. The apparatus of claim 2, wherein the second support is rotated within an angle greater than 0 degrees and less than or equal to 15 degrees.

4. The apparatus of claim 3, wherein the second support comprises:
a second supporting pin having ends coupled to the second frame, an axis of the second supporting pin being parallel to the rotation axis;
a third supporting plate between the second supporting pin and the rotation axis and pivotably coupled to the second supporting pin; and
a fourth supporting plate coupled to the second supporting pin and positioned at an opposite side of the second supporting pin with respect to the third supporting plate.

5. The apparatus of claim 4, wherein, when the fourth supporting plate is rotated with respect to the reference surface, the third supporting plate is rotated about the axis of the second supporting pin to form a fourth rotation angle between the third supporting plate and the fourth supporting plate that is greater than or equal to a third rotation angle between the reference surface and the fourth supporting plate.

6. The apparatus of claim 5, further comprising:
a holder under ends of the first and third supporting plates adjacent to the rotation axis and configured to support the ends of the first and third supporting plates.

7. The apparatus of claim 6, wherein, when the second and fourth supporting plates are rotated, the holder is configured to move away from the ends of the first and third supporting plates.

8. The apparatus of claim 1, wherein the second supporting plate and the first frame are rotated at the same angle.

9. The apparatus of claim 1, wherein the first direction is a clockwise direction, and the second direction is a counter-clockwise direction.

10. The apparatus of claim 1, wherein, in a first state, upper surfaces of the first supporting plate and the second supporting plate are on a same plane, and wherein, in a second state in which the second supporting plate is rotated in the first direction with respect to the rotation axis and the first supporting plate is rotated in the second direction opposite the first direction with respect to the axis of the first supporting pin, a reflex angle is formed between the upper surface of the first supporting plate and the upper surface of the second supporting plate.

11. An apparatus for supporting a display panel, the apparatus comprising:
first and second supports configured to support the display panel, the first and second supports being rotatable about a rotation axis;
a first frame coupled to a side of the first support and configured to be rotated with the first support; and
a second frame coupled to a side of the second support and configured to be rotated with the second support,
wherein the first support comprises:
a first supporting pin having ends coupled to the first frame, an axis of the first supporting pin being parallel to the rotation axis;
a first supporting plate between the first supporting pin and the rotation axis and pivotably coupled to the first supporting pin; and
a second supporting plate coupled to the first supporting pin and positioned at an opposite side of the first supporting pin with respect to the first supporting plate,
wherein the second support comprises:
a second supporting pin having ends coupled to the second frame, an axis of the second supporting pin being parallel to the rotation axis;
a third supporting plate between the second supporting pin and the rotation axis and pivotably coupled to the second supporting pin; and
a fourth supporting plate coupled to the second supporting pin and positioned at an opposite side of the second supporting pin with respect to the third supporting plate, and
wherein, when the second supporting plate is rotated, the first supporting pin is configured to move with respect to the first frame, and
wherein a first distance between the rotation axis and a first end of the first supporting plate nearest the rotation axis in a first state in which an angle between upper surfaces of the first and third supporting plates is 180° is less than a second distance between the rotation axis and the first end of the first supporting plate in a second state in which the angle between the upper surfaces of the first and third supporting plates is less than 180°.

12. The apparatus of claim 11, wherein the first supporting pin is configured to move in a direction away from the rotation axis.

13. The apparatus of claim 12, wherein guide parts are at the first frame and coupled to respective ends of the first supporting pin.

14. The apparatus of claim 13, wherein each of the guide parts has an oblong shape.

15. The apparatus of claim 14, wherein each of the guide parts has a groove shape.

16. The apparatus of claim 14, wherein each of the guide parts is a through-hole.

* * * * *